(12) United States Patent
Huh et al.

(10) Patent No.: US 8,509,443 B2
(45) Date of Patent: Aug. 13, 2013

(54) REKEY INDEX GENERATION METHOD AND REKEY INDEX GENERATION APPARATUS

(75) Inventors: Mi Suk Huh, Suwon-si (KR); Dae Youb Kim, Seoul (KR); Hwan Joon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1467 days.

(21) Appl. No.: 11/798,401

(22) Filed: May 14, 2007

(65) Prior Publication Data

US 2008/0123853 A1 May 29, 2008

(30) Foreign Application Priority Data

Nov. 29, 2006 (KR) .................. 10-2006-0119000

(51) Int. Cl.
*H04L 9/00* (2006.01)
*H04L 9/08* (2006.01)
*H04L 29/06* (2006.01)
*H04L 9/32* (2006.01)
*H04K 1/00* (2006.01)

(52) U.S. Cl.
USPC ............. 380/277; 380/273; 380/278; 380/44; 713/150; 713/153; 713/171

(58) Field of Classification Search
USPC ................... 380/277, 273, 278, 44; 713/150, 713/153, 171
See application file for complete search history.

(56) References Cited

U.S. PATENT DOCUMENTS

| | | | | |
|---|---|---|---|---|
| 5,241,652 | A | * | 8/1993 | Barabash et al. ............... 706/48 |
| 7,660,983 | B1 | * | 2/2010 | Srivastava et al. ............ 713/163 |
| 2001/0042204 | A1 | * | 11/2001 | Blaker et al. ................... 713/165 |
| 2004/0114762 | A1 | | 6/2004 | Medvinsky .................... 380/277 |
| 2005/0018853 | A1 | * | 1/2005 | Lain et al. ...................... 380/277 |
| 2005/0271210 | A1 | * | 12/2005 | Soppera ......................... 380/277 |
| 2007/0005975 | A1 | * | 1/2007 | Bauchot et al. ................ 713/171 |
| 2007/0230468 | A1 | * | 10/2007 | Narayanan et al. ............ 370/392 |
| 2007/0258586 | A1 | * | 11/2007 | Huang et al. ................... 380/201 |
| 2008/0235251 | A1 | * | 9/2008 | Shmueli et al. ................ 707/100 |

OTHER PUBLICATIONS

Lee, Goon Yeon et al., "Efficient Rekey Interval for Minimum Cost on Secure Multicast System using Group Key", 2003-40TC-1-2 (7 pages, in Korean).
Baag, Jin-Young et al. "The Study of Efficient Rekey Interval Allotment for Minimum Cost on Secure Multicast", Journal of Industrial Technology, Kangwon Nat'l Univ., Korea, No. 21 A, 2001 (6 pages, in Korean).

\* cited by examiner

*Primary Examiner* — Aravind Moorthy
(74) *Attorney, Agent, or Firm* — NSIP Law

(57) ABSTRACT

A rekey index generation method and a rekey index generation apparatus are provided. The rekey index generation method includes inserting join information to a first field of a rekey index when new members join a group; and inserting node numbers, corresponding to each of the new members, into a second field of the rekey index for a receiver to select a necessary key from among transmitted encoded keys.

19 Claims, 8 Drawing Sheets

REKEY INDEX GENERATION METHOD AND REKEY INDEX GENERATION APPARATUS

CROSS-REFERENCE TO RELATED APPLICATION

This application claims the benefit under 35 U.S.C. §119(a) of a Korean Patent Application No. 10-2006-0119000, filed on Nov. 29, 2006, in the Korean Intellectual Property Office, the entire disclosure of which is hereby incorporated by reference.

BACKGROUND OF THE INVENTION

1. Field of the Invention

The present invention relates to a group key update which updates a key of members in a group. More particularly, the present invention relates to a rekey index generation method and a rekey index generation apparatus which allows a member in a group to effectively select a necessary encoded key from among encoded keys transmitted from a server.

2. Description of Related Art

Contents which are provided to group members are typically encrypted, so that other users can not use the contents. Accordingly, all of the group members should have an encryption key, provided from a server, capable of decoding the encrypted contents.

In this case, updating an encryption key is an important issue. For example, when new members join a group, the group is required to allow the new member to restrictively access contents. Later, after the new member joins the group, when the existing group members update the encryption key, and the new member may share the updated key.

Also, when one of the existing group members leaves the group, the group key, used by all group members before the leaving member leaves the group, is required to be updated so that the leaving member no longer has access to the contents.

Generally, methods of updating the group key are performed in two ways.

In one method, a server calculates an updated key and transmits the updated key to a member requiring the updated key, when it is required to update a group key. This method is problematic due to the great burden placed upon the server since the server is required to calculate the group key for all group members who require the updated group key, and to transmit the calculated group key.

In another method, members that are capable and require the update voluntarily calculate the group key and perform a required update, while the server transmits the updated key to only those members incapable of performing a self-update when it is required to update the group key. In the case of this method, of the burden placed upon the server is not great since the server calculates to transmit the updated group key to only those members incapable of performing the self-update.

A member device that downloads an updated key from a server is required to select necessary information for the member device from among updated keys transmitted from the server. For this, the server transmits a rekey index, and the member device receives the transmitted rekey index and selects a necessary key from among the received updated keys, using information inserted into the rekey index.

Accordingly, there is a need for an improved rekey index generation method and rekey index generation apparatus in order to effectively select a necessary update key which is required in a device.

SUMMARY OF THE INVENTION

Exemplary embodiments of the present invention address at least the above problems and/or disadvantages and provide at least the advantages described below. Accordingly, an aspect of exemplary embodiments of the present invention provides a rekey index generation method and a rekey index generation apparatus which allows a device to effectively select a necessary key for a key update.

An aspect of exemplary embodiments of the present invention provides a rekey index generation method and a rekey index generation apparatus which can reduce a transmission overhead by reducing an amount of information inserted into a rekey index.

An aspect of exemplary embodiments of the present invention also provides a rekey index generation method and a rekey index generation apparatus which can effectively perform a key update since a first node change is performed by transmitting a node number to be deleted, a second node change is performed, and a necessary encoding key is selected by subsequently transmitting a node number corresponding to a leaf node when members leave a group.

An aspect of exemplary embodiments of the present invention also provides a rekey index generation method and a rekey index generation apparatus which can reduce a memory capacity required for a member device when updating a key since a necessary encoding key is selected by storing node information limited to a predetermined length.

According to an aspect of exemplary embodiments of the present invention, there is provided a rekey index generation method including inserting join information to a first field of a rekey index when new members join a group; and inserting node numbers, corresponding to each of the new members, to a second field of the rekey index for a receiver to select a necessary key among transmitted encoded keys.

An aspect of exemplary embodiments of the present invention provides that the receiver may identify an ancestor node of a node corresponding to each of the node numbers inserted into the second field of the rekey index as an update target node. Accordingly, an aspect of exemplary embodiments further provides that the update target node is a type of node wherein a key of a corresponding node is required to be updated, and the updating may be performed by either downloading an encoded key transmitted from a server or self-updating using a key of a descendent node of the corresponding node.

According to another aspect of exemplary embodiments of the present invention, there is provided a rekey index generation method including inserting leave information into a first field of a rekey index when members leave a group; inserting node numbers of the highest nodes of all ancestor nodes in the group, whose descendant leaf nodes and corresponding devices, all leave, into a second field of the rekey index to perform a first node change; and inserting node numbers of ancestor nodes of leaf nodes, corresponding to the first node change, to a third field of the rekey index to perform a second node change and select a necessary key from among encoded keys in a receiver.

An aspect of exemplary embodiment of the present invention provides that the leaf nodes corresponding to a first node change may be influenced by the first node change from among the leaf nodes.

According to another aspect of exemplary embodiments of the present invention, there is provided a rekey index generation apparatus including a first field generation module inserting join information into a first field of a rekey index when new members join a group; and a second field generation module inserting node numbers, corresponding to each of the new members, into a second field of the rekey index for a receiver to select a necessary key from among transmitted encoded keys.

According to another aspect of exemplary embodiments of the present invention, there is provided a rekey index generation apparatus including a first field generation module inserting leave information into a first field of a rekey index when members leave a group; a second field generation module inserting node numbers of the highest nodes of all ancestor nodes in the group, whose descendant leaf nodes all leave, to a second field of the rekey index to perform a first node change; and a third field generation module inserting node numbers of ancestor nodes of leaf nodes, corresponding to the first node change, to a third field of the rekey index to perform a second node change and select a necessary key among encoded keys in a receiver.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following detailed description, taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
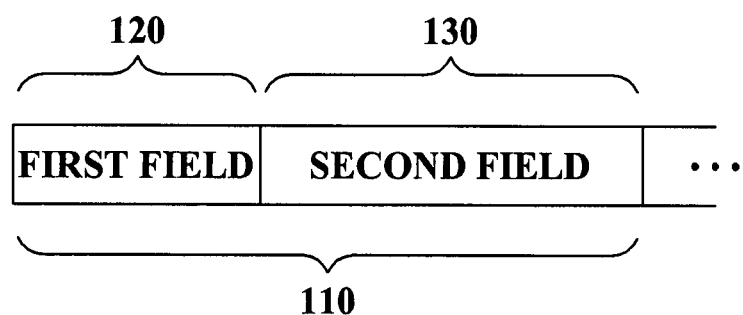
FIG. 1 is a diagram illustrating a rekey index according to an exemplary embodiment of the present invention.

FIG. 1 is a diagram illustrating a rekey index 110 according to an embodiment of the present invention.

Referring to FIG. 1, the rekey index 110 includes a first field 120 and a second field 130.

The first field 120 may include join information and leave information. In this case, the join information indicates that the rekey index 110 performs a rekey, occurring as a result of new members joining a group. In this case, the leave information indicates that the rekey index 110 performs a rekey, occurring as a result of existing members leaving the group. For example, the first field 120 may be configured with one bit, where '0' indicates the join information, and '1' indicates the leave information.

The second field 130 may include node numbers corresponding to the new members when the new members join the group.

For example, when new members A, B, and C join the group, and when node numbers corresponding to new members A, B, and C are 17, 18, then 17, 18, and 19, 17, 18, and 19 may be inserted into the second field 130.

Figure 2:
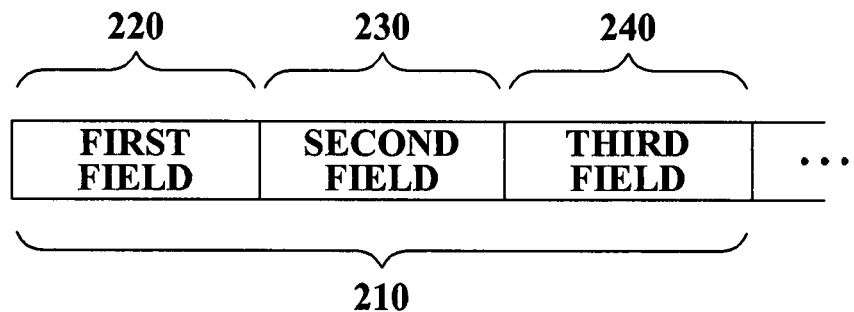
FIG. 2 is a diagram illustrating a rekey index according to another exemplary embodiment of the present invention.

FIG. 2 is a diagram illustrating a rekey index 210 according to another embodiment of the present invention.

Referring to FIG. 2, the rekey index 210 according to another embodiment of the present invention includes a first field 220, a second field 230, and a third field 240.

The first field 220 of the rekey index 210 of FIG. 2 corresponds to the first field 120 of the rekey index 110 of FIG. 1, and the second field 230 and the third field 240 correspond to the second field 130 of the rekey index of FIG. 1.

The first field 220 may include join information and leave information.

The second field 230 may include node numbers of the highest nodes of all ancestor nodes in the group, whose descendant leaf nodes and corresponding devices, all leave, for a receiver to perform a first node change when existing members leave the group.

The third field 240 may include node numbers of ancestor nodes of each of all leaf nodes on a tree, where the first node change is performed so that a second node change is performed, and a necessary key may be selected from among transmitted encoded keys. In this case, the ancestor node may be parent nodes of the leaf nodes.

Figure 3:
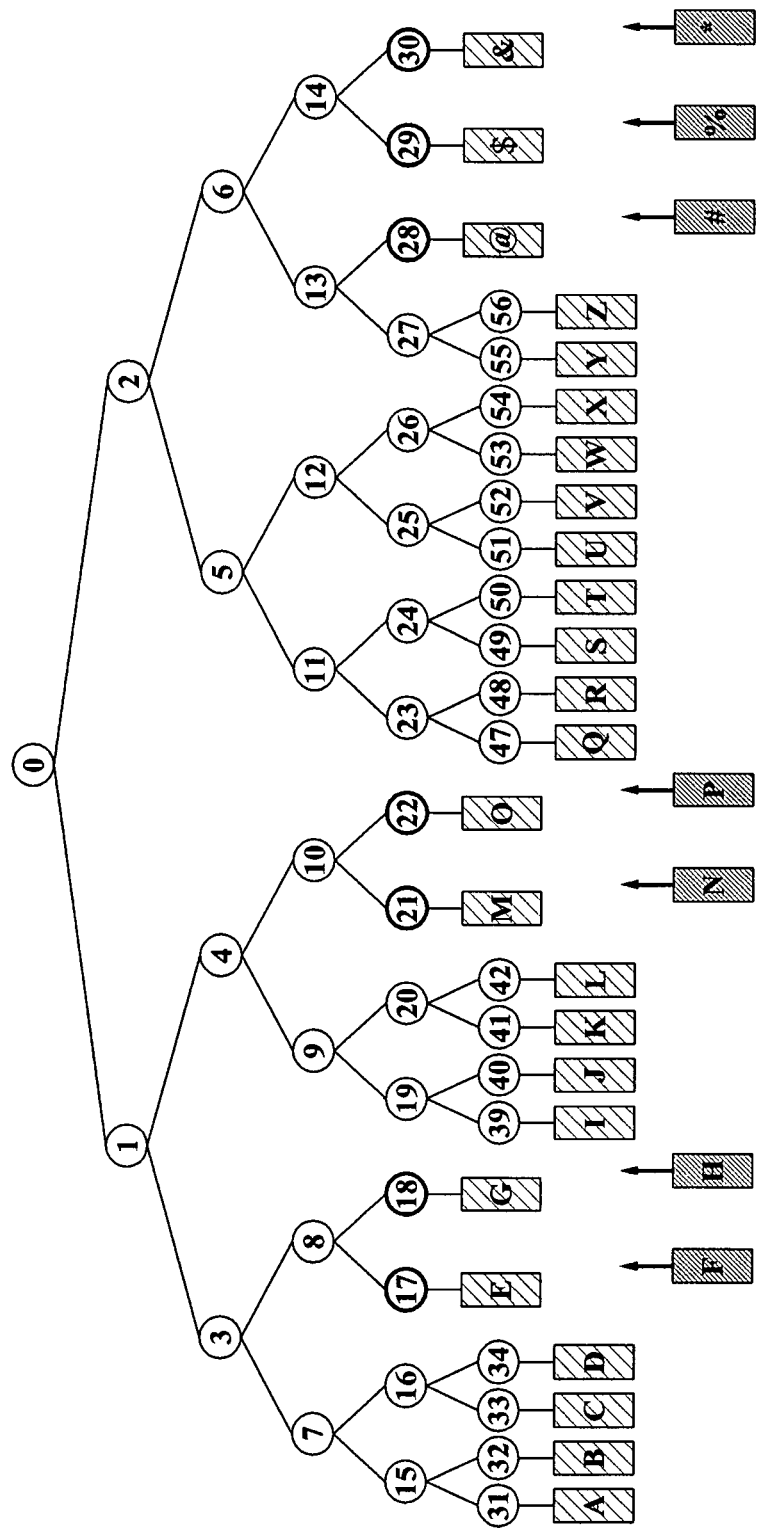
FIG. 3 is a diagram illustrating an example of a binary tree corresponding to a group when new members join the group.

FIG. 3 is a diagram illustrating an example of a binary tree corresponding to a group when new members join the group.

Referring to FIG. 3, new members F, H, N, P, #, %, and * join a group. When new members F, H, N, P, #, %, and * join the group, existing members 17, 18, 21, 22, 28, 29, and 30 are split to generate new leaf nodes, and subsequently new members F, H, N, P, #, %, and * correspond to the new leaf nodes.

Figure 4:
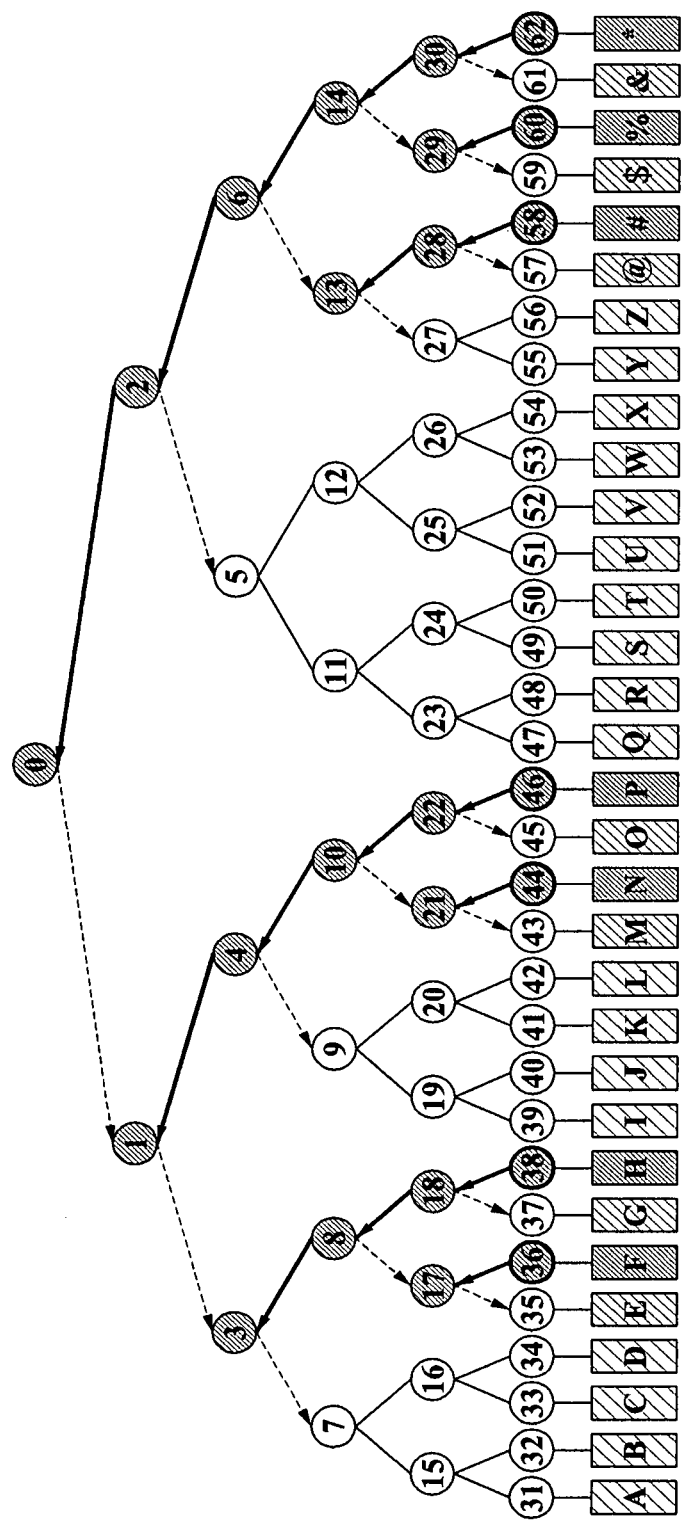
FIG. 4 is a diagram illustrating the binary tree corresponding to the group when processing of the new members joining is completed with respect to the binary tree of FIG. 3.

FIG. 4 is a diagram illustrating the binary tree corresponding to the group where processing of the new members' joining is completed with respect to the binary tree of FIG. 3.

Referring to FIG. 4, node 17 splits to generate nodes 35 and 36, node 18 splits to generate nodes 37 and 38, node 21 splits to generate nodes 43 and 44, node 22 splits to generate nodes 45 and 46, node 28 splits to generate nodes 57 and 58, node 29 splits to generate nodes 59 and 60, and node 30 splits to generate nodes 61 and 62.

In this case, new member F corresponds to node 36, new member H corresponds to node 38, new member N corresponds to node 44, new member P corresponds to node 46, new member # corresponds to node 58, new member % corresponds to node 60, and new member * corresponds to node 62.

New members F, H, N, P, #, %, and * are not required to be aware of a group key before new members F, H, N, P, #, %, and * join the group. Accordingly, node keys in the group are required to be updated as a result of new members F, H, N, P, #, %, and * joining the group. In this case, a node key of the leaf nodes may be updated as a member key of each member.

Nodes 0, 1, 2, 3, 4, 6, 8, 10, 13, 14, 17, 18, 21, 22, 28, 29, and 30 become update target nodes since nodes 0, 1, 2, 3, 4, 6, 8, 10, 13, 14, 17, 18, 21, 22, 28, 29, and 30 are required to be updated, among nodes other than the leaf nodes.

According to an embodiment of the present invention, a server inserts join information to a first field of a rekey index to report that the key update with respect to the new members' joining in the group. For example, the join information may be a logic '0'.

Also, according to an embodiment of the present invention, the server inserts node numbers of nodes 36, 38, 44, 46, 58, 60, and 62 corresponding to new members F, H, N, P, #, %, and * to the second field of the rekey index so that a necessary key is selected from the transmitted encoded keys.

In this case, the encoded node keys of nodes 0, 1, 3, 8, 17, 18, 4, 10, 21, 22, 2, 6, 13, 28, 14, 29, 30 may be sequentially transmitted from a server with the rekey index.

Accordingly, the receiver identifies new members F, H, N, P, #, %, and * joining the group by using the join information inserted into the rekey index, which receives the rekey index from the server, and the receiver selects the necessary key from the encoded keys transmitted from the server using the node numbers of nodes 36, 38, 44, 46, 58, 60, and 62.

For example, since a sibling node key of node 36 is updated, node 35 corresponding to member E is updated, and a node key of node 17 is selected from the encoded keys transmitted from the server according to a predetermined rule, the predetermined rule indicating to self-update a node key of an ancestor node using a node key of a node whose node number is greater. Also, member E selects a node key of node 8, that is one of the encoded keys transmitted from the server, according to the predetermined rule since the node key of node 18 is updated, that is the node key of the sibling node of node 17 is updated. Also, member E self-updates a node key of node 3 using a node key of node 8 since a node key of node 7, a sibling node of node 8, is not updated. Also, member E selects a node key of node 1, that is the encoded keys transmitted from the server, since a node key of node 4, a sibling node of node 3, is updated, and selects a node key of node 0, that is the encoded keys transmitted from the server, since a node key of node 2, the sibling node of node 1, is updated.

Namely, the receiver may select the necessary key using an order of the node numbers inserted in the second field, the necessary key having been encoded using a key of a leaf node corresponding to the receiver or a key of an ancestor node of the leaf node corresponding to the receiver, from among the transmitted encoded keys.

Consequently, the receiver, receiving the rekey index, may effectively select the necessary encoded key among the encoded keys with respect to an update target node, which is transmitted in a predetermined order from the server. In this case, ancestor nodes corresponding to each of node numbers 36, 38, 44, 46, 58, 60, and 62, which are inserted into the second field of the rekey index, may be identified as the update target node.

Figure 5:
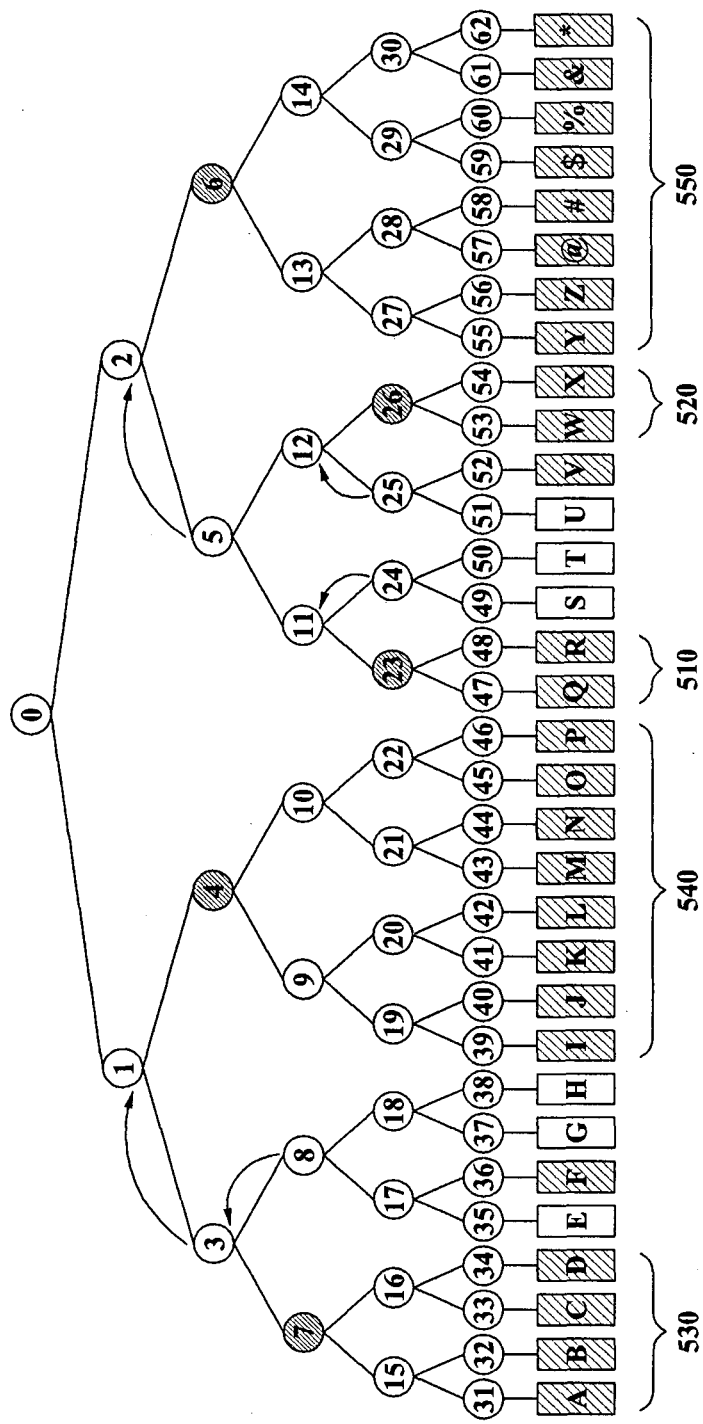
FIG. 5 is a diagram illustrating an example of a binary tree corresponding to a group when existing members leave a group.

FIG. 5 is a diagram illustrating an example of a binary tree corresponding to a group when existing members leave a group.

Referring to FIG. 5, all descendent nodes 510 of node 23 leave the group, all descendent nodes 520 of node 26 leave the group, all descendent nodes 530 of node 7 leave the group, all descendent nodes 540 of node 4 leave the group, and all descendent nodes 550 of node 6 leave the group.

According to an embodiment of the present invention, a server inserts leave information to a first field of a rekey index in order to report a key update with respect to new members' leaving the group. For example, the leave information may be a logic '1'.

In this case, nodes 23, 26, 7, 4, and 6 may be the highest nodes of all ancestor nodes in the group, whose corresponding descendant leaf nodes and corresponding devices, all leave. According to an embodiment of the present invention, the node numbers of nodes 23, 26, 7, 4, and 6 are inserted into a second field of the rekey index. Accordingly, the node numbers of nodes 23, 26, 7, 4, and 6 may be inserted into the second field of the rekey index in an order node of numbers from a lower level to a higher level.

The highest nodes are the ancestor nodes selected to be inserted into the second field of the rekey index, specifically, the ancestor nodes in which all descendent nodes leave the group. For example, node 15 can not be the highest node since only descendent nodes A and B of node 15 leave the group, but all descendent nodes A, B, C, and D of node 7 leave the group.

The receiver, receiving the rekey index transmitted from the server, may identify leave information inserted into the first field of the received rekey index, and perform a key update when required according to existing members' leave.

Also, the receiver, receiving the rekey index transmitted from the server, performs a first node change using node numbers inserted into the second field of the rekey index.

Namely, the receiver receives the node numbers of nodes 23, 26, 7, 4, and 6, which were inserted into the second field, and performs the first node change in an order of the received node numbers of nodes 23, 26, 7, 4, and 6. The receiver deletes node 23 and the lower nodes of node 23, and replaces ancestor node 11 of node 23 with node 24, a sibling node of node 23, since the node number of node 23 is received.

Also, the receiver deletes node 26 and the lower nodes of node 26, and replaces ancestor node 12 of node 26 with node 25, a sibling node of node 26, since the node number of node 26 is received.

Also, the receiver deletes node 7 and the lower nodes of node 7, and replaces ancestor node 3 of node 7 with node 8, a sibling node of node 7, since the node number of node 7 is received. In this case, descendent nodes of node 8 become descendent nodes of node 3.

Also, the receiver deletes node 4 and the lower nodes of node 4, and replaces ancestor node 1 of node 4 with node 3, a sibling node of node 4, since the node number of node 4 is received. In this case, descendent nodes of node 3 become descendent nodes of node 1.

Also, the receiver deletes node 6 and the lower nodes of node 6, and replaces ancestor node 2 of node 6 with node 5, a sibling node of node 6, since the node number of node 6 is received. In this case, descendent nodes of node 5 become descendent nodes of node 2.

Figure 6:
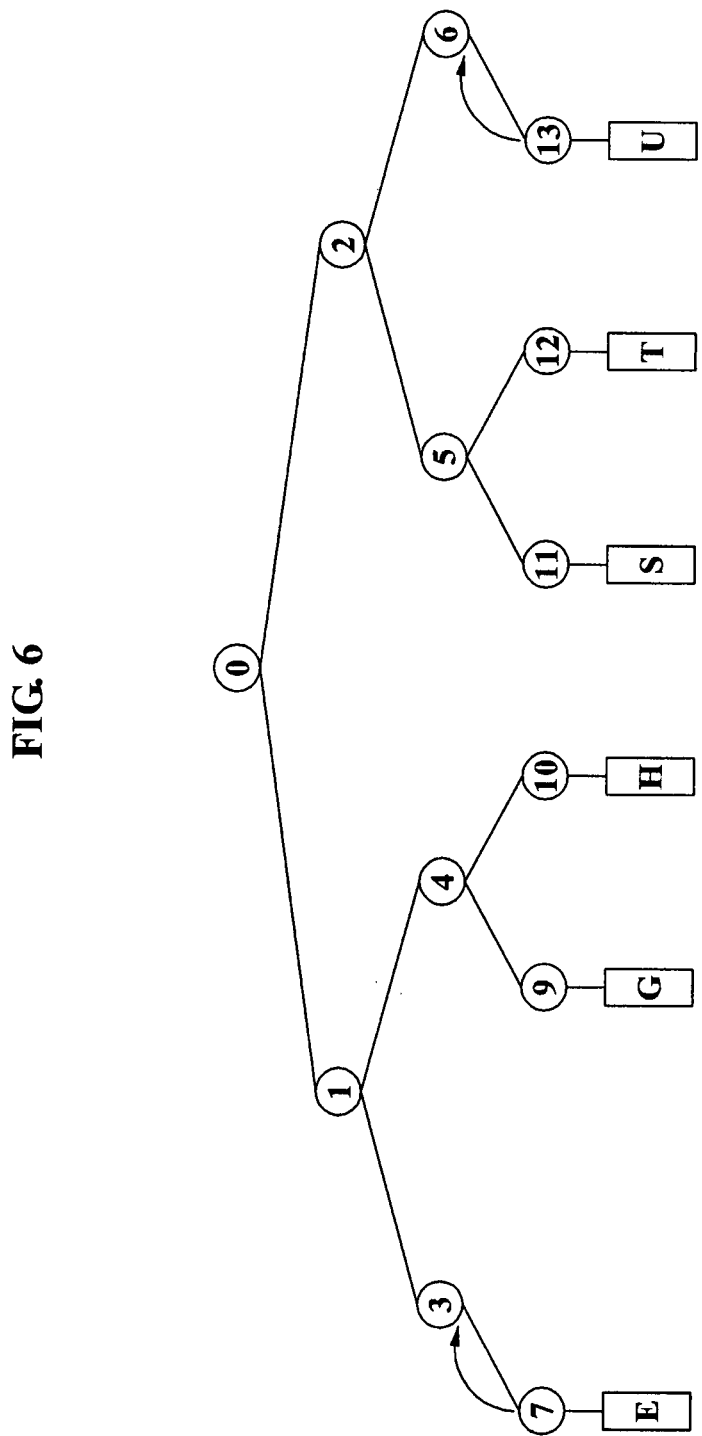
FIG. 6 is a diagram illustrating the binary tree where a first node change has been performed with respect to the binary tree of FIG. 5.

FIG. 6 is a diagram illustrating the binary tree where the first node change has been performed with respect to the binary tree of FIG. 5.

Referring to FIG. 6, most unnecessary nodes are deleted as a result of existing members leaving the group after the first node change.

Node 7 corresponding to member E may replace node 3 with node 7 since a sibling node does not exist for node 7. Also, node 13 corresponding to member U may replace node 6 with node 13 since a sibling node does not exist for node 13.

The replacing of node 3 with node 7 and the replacing of node 6 with node 13 correspond to a second node change according to an embodiment of the present invention.

The receiver, transmitting the rekey index, inserts parent node numbers 3, 4, 4, 5, 5, and 6 of nodes 7, 9, 10, 11, 12, and 13, corresponding to remaining members after a leave, to a third field of the rekey index in order for the receiver to select necessary encoded node keys for the second node change.

In this case, a node number of node 4 is repeatedly inserted into the rekey index since member G and member H have the identical ancestor node 4. Also, a node number of node 5 is repeatedly inserted into the rekey index since member S and member T have the identical ancestor node 5.

The receiver, receiving the rekey index, performs the second node change with respect to unique node numbers 3 and 6 from among node numbers inserted into the third field of the rekey index. Namely, nodes 3 and 6 become leaf nodes.

In this case, ancestor nodes 0, 1, and 2 of nodes corresponding to node numbers inserted into the third field, become update target nodes.

Figure 7:
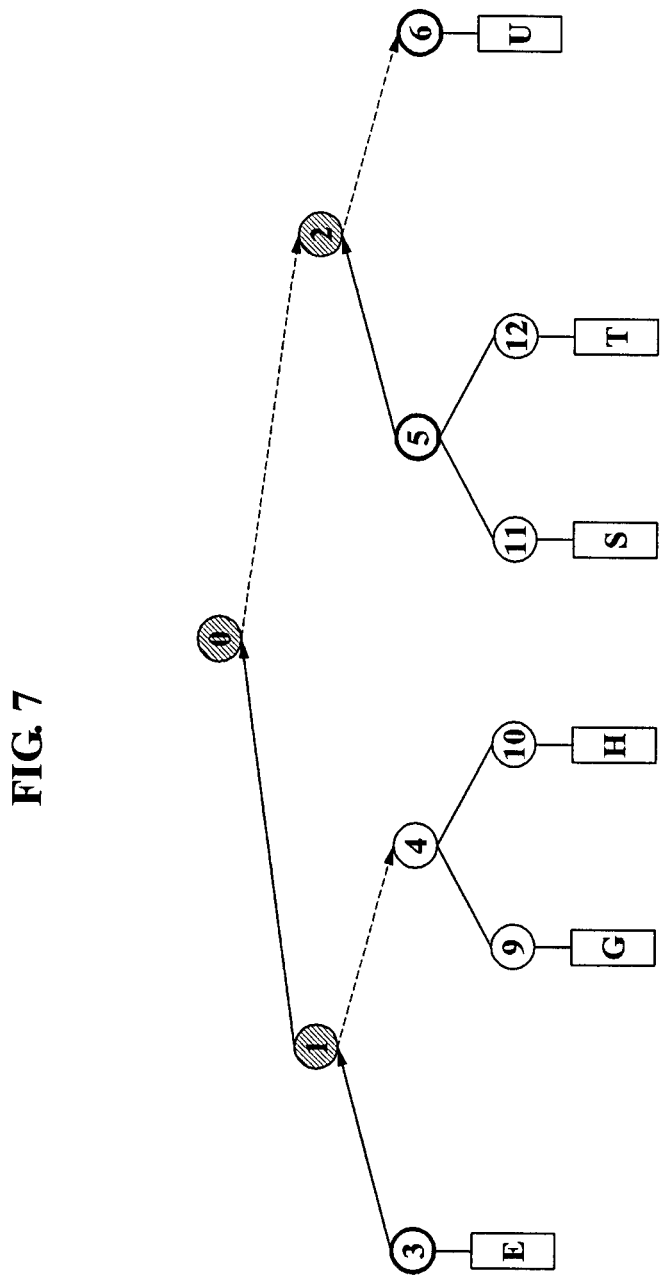
FIG. 7 is a diagram illustrating the binary tree where a second node change has been performed with respect to the binary tree of FIG. 5.

FIG. 7 is a diagram illustrating the binary tree where the second node change has been performed with respect to the binary tree of FIG. 5.

Referring to FIG. 7, member E receives a rekey index, performs a first node change and a second node change, and updates node keys of nodes 1 and 0. A node key of node 1 is generated using any one of node keys of updated node 3 and 4 since a node key of node 4, a sibling node of node 3 corresponding to member E, is updated. The node key of node 1 is updated using the node key of node 3 since a node number of node 3 is less than a node number of node 4. Accordingly, member E self-updates the node keys of nodes 1 and 0 using the node key of the updated node 3. In this case, member E may generate the node keys of nodes 1 and 0 using an output of a one-way function.

Member G may recognize an update of a sibling node has occurred since a node number 3 exists in a third field of the rekey index, when receiving a rekey index. Member G is required to receive a node key of an updated node 4 from a server since the node number of node 4 is greater than the node number of node 3. Accordingly, member G selects the node key of the encoded node 1 among the encoded keys transmitted from the server. In this case, the node key of the encoded node 1 may be encoded as the node key of node 4.

Figure 8:
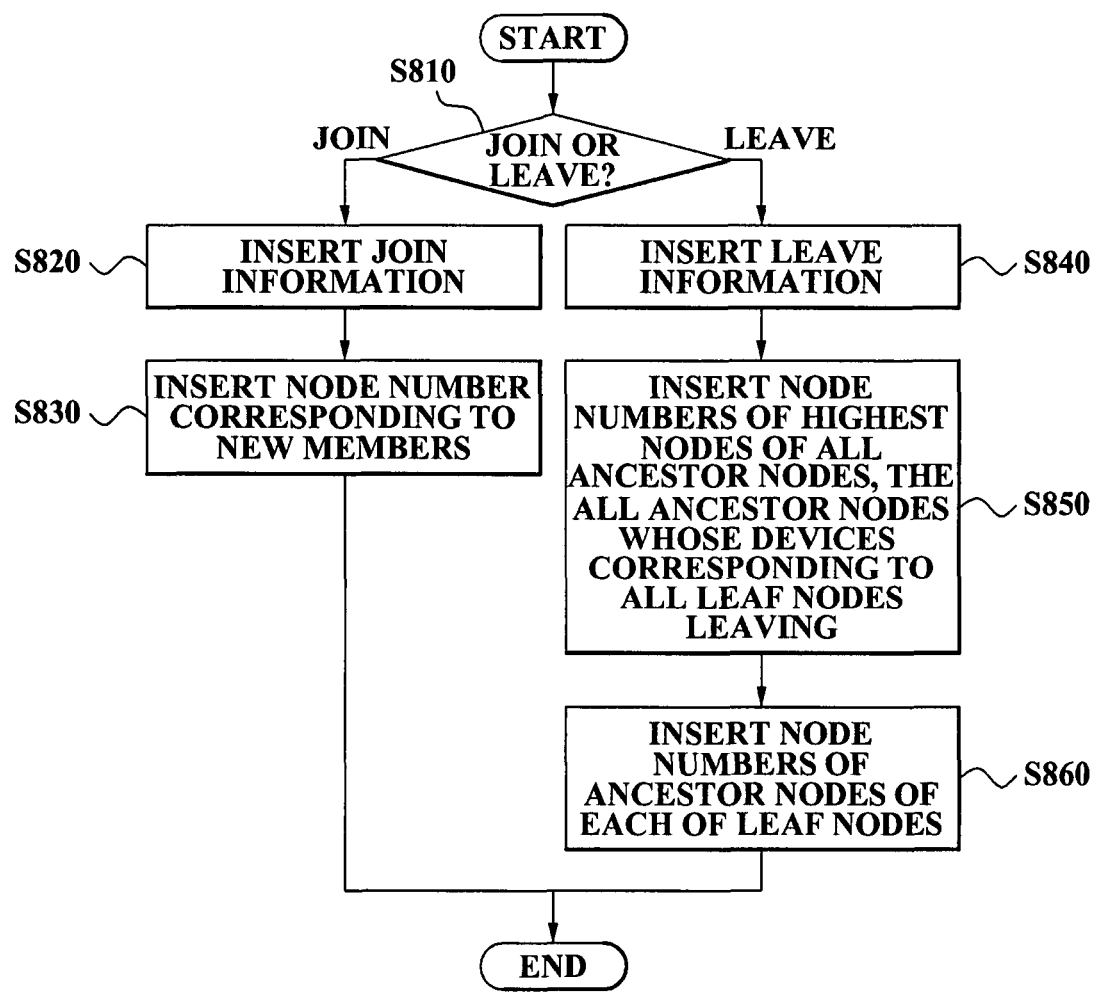
FIG. 8 is a flowchart illustrating a rekey index generation method according to an exemplary embodiment of the present invention.

FIG. 8 is a flowchart illustrating a rekey index generation method according to an embodiment of the present invention.

Referring to FIG. 8, in operation S810, the rekey index generation method according to an embodiment of the present invention determines whether a join or leave with respect to a group occurs.

When it is determined that the join has occurred with respect to the group as a result of the determination in operation S810, the rekey index generation method according to an embodiment of the present invention inserts join information to a first field of a rekey index in operation S820.

Also, the rekey index generation method according to an embodiment of the present invention inserts a node number, corresponding to each of newly joined members, to the second field of the rekey index, and the inserting also functions to enable a receiver to select a necessary key from among transmitted encoded keys in operation S830.

In this case, the receiver may identify an ancestor node of a node corresponding to each of the node numbers, inserted into the second field of the rekey index, as an update target node.

Accordingly, the transmitted encoded keys are transmitted to the receiver in a predetermined order, and the receiver selects the necessary key for a key update of the update target node from among the transmitted encoded keys, using an order of the node numbers inserted into the second field of the rekey index.

Accordingly, the receiver selects the necessary key, which is encoded using either a key of a leaf node corresponding to the receiver or a key of an ancestor node of the leaf node corresponding to the receiver, from among the transmitted encoded keys.

When it is determined that a leave has occurred with respect to the group as a result of operation S810, the rekey index generation method according to an embodiment of the present invention inserts leave information into the first field of the rekey index in operation S840.

Also, the rekey index generation method according to an embodiment of the present invention inserts node numbers of the highest nodes of all ancestor nodes in the group, whose corresponding descendant leaf nodes all leave, into the second field of the rekey index to perform a first node change in operation S850.

Also, the rekey index generation method according to an embodiment of the present invention inserts node numbers of ancestor nodes of leaf nodes corresponding to the first node change into a third field of the rekey index in order to perform a second node change and to select a necessary key from among encoded keys in a receiver in operation S860.

In this case, the leaf nodes corresponding to the first node change may be leaf nodes influenced by the first node change.

Accordingly, the receiver may delete a node corresponding to the node numbers inserted into the second field of the rekey index, and replace the ancestor nodes corresponding to the node numbers inserted into the second field with sibling nodes of nodes corresponding to the node numbers inserted into the second field.

Herein, the receiver may replace a node corresponding to a unique node number from among the node numbers inserted into the third field of the rekey index with a leaf node, and recognize an ancestor node of the node numbers inserted into the third field as an update target node.

Herein, the transmitted encoded keys may be transmitted to the receiver in the predetermined order, and the receiver may select the necessary key for the key update of the update target node from among the transmitted encoded keys using the order of the node numbers inserted into the third field.

Accordingly, the receiver may select the necessary key, which is encoded using a key of the leaf node corresponding to the receiver or by using a key of the ancestor node of the leaf node corresponding to the device, from among the transmitted encoded keys.

The rekey index generation method according to the above-described embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Figure 9:
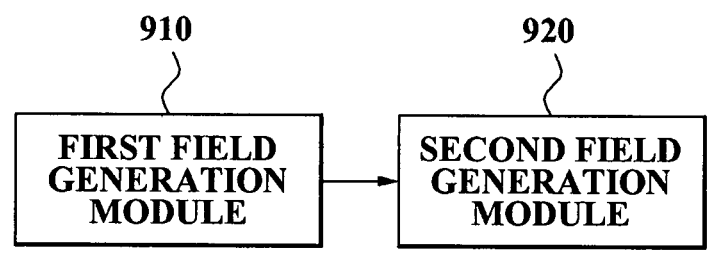
FIG. 9 is a block diagram illustrating a rekey index generation apparatus according to an exemplary embodiment of the present invention.

FIG. 9 is a block diagram illustrating a rekey index generation apparatus according to an embodiment of the present invention.

Referring to FIG. 9, the rekey index generation apparatus according to an embodiment of the present invention includes a first field generation module 910 and a second field generation module 920.

The first field generation module 910 inserts join information to a first field of a rekey index when new members join a group.

After the first field generation module 910 inserts the join information to the first field of the rekey index, the second field generation module 920 inserts node numbers, corresponding to each of the new members, to a second field of the rekey index for a receiver to select a necessary key among transmitted encoded keys.

Figure 10:
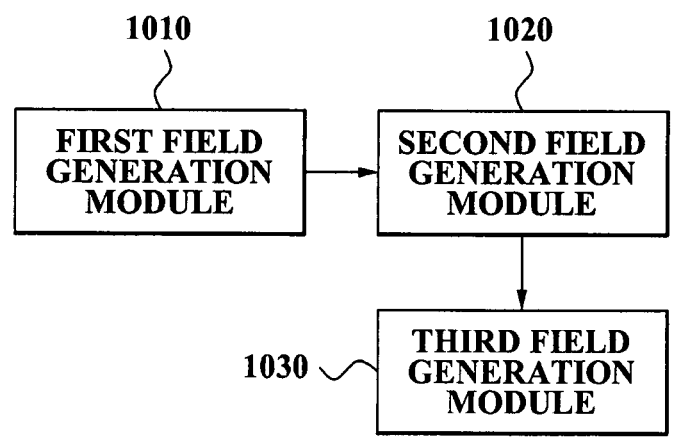
FIG. 10 is a block diagram illustrating a rekey index generation apparatus according to another exemplary embodiment of the present invention.

FIG. 10 is a block diagram illustrating a rekey index generation apparatus according to another embodiment of the present invention.

Referring to FIG. 10, the rekey index generation apparatus according to another embodiment of the present invention includes a first field generation module 1010, a second field generation module 1020, and a third field generation module 1030.

The first field generation module 1010 inserts leave information into the first field of the rekey index when members leave the group.

After the first field generation module 1010 inserts the leave information into the first field of the rekey index, the second field generation module 1020 inserts node numbers of the highest nodes of all ancestor nodes in the group to a second field of the rekey index to perform a first node change, the group where devices of leaf nodes corresponding to descendent nodes of the all ancestor nodes in the group leave.

After the second field generation module 1020 inserts the node numbers into the second field of the rekey index, the third field generation module 1030 inserts node numbers of ancestor nodes of leaf nodes corresponding to the first node change to a third field of the rekey index to perform a second node change and to select a necessary key among encoded keys in a receiver.

Descriptions which are not described with respect to the apparatuses of FIGS. 9 and 10 will be omitted in this specification since the descriptions are already described in FIGS. 1 through 8.

According to a rekey index generation method and a rekey index generation apparatus of an exemplary embodiment of the present invention, devices may effectively select a necessary key for a key update.

Also, according to a rekey index generation method and a rekey index generation apparatus of an exemplary embodiment of the present invention, transmission overhead may be reduced by reducing an amount of information inserted into a rekey index.

Also, according to a rekey index generation method and a rekey index generation apparatus of an exemplary embodiment of the present invention, a key update may be effectively performed since a first node change is performed by transmitting a node number to be deleted, performing a second node change, and selecting a necessary encoding key by subsequently transmitting a node number corresponding to a leaf node when members leave a group.

Also, according to a rekey index generation method and a rekey index generation apparatus of an exemplary embodiment of the present invention, a required memory capacity may be reduced for a member device when updating a key since a necessary encoding key is selected by storing node information limited to a predetermined length.

While the invention has shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A rekey index generation method, the method comprising:
    inserting join information into a first field of a rekey index when new members join a group;
    splitting one or more existing nodes corresponding to one or more existing members to generate new nodes corresponding to the new members and the one or more existing members;
    inserting new node numbers, corresponding to each of the new members, into a second field of the rekey index in an order that enables a receiver to select a necessary key from among transmitted encoded keys based on the order of the new node numbers included in the second field; and
    transmitting, to one or more receivers corresponding to one or more update target nodes, encoded keys for each respective update target node and the rekey index comprising leave information in the first field, the node numbers of the highest nodes of ancestor nodes in the group whose descendant leaf nodes all leave in the second field, and the node numbers of all nodes connected with only one member in the third field.

2. The method of claim 1, wherein a receiver identifies an ancestor node of a node corresponding to each of the node numbers, which were inserted into the second field of the rekey index, as an update target node.

3. The method of claim 2, wherein the transmitted encoded keys are transmitted to the receiver in a predetermined order, and the receiver selects the necessary key for a key update of the update target node from among the transmitted encoded keys using an order of the node numbers inserted to the second field.

4. The method of claim 3, wherein the receiver selects the necessary key, which is encoded using a key of a leaf node corresponding to the receiver or using a key of an ancestor node of the leaf node corresponding to the receiver, from among the transmitted encoded keys.

5. A rekey index generation method, the method comprising:
    inserting leave information into a first field of a rekey index when members leave a group;
    inserting node numbers of the highest nodes of all ancestor nodes in the group, whose descendant leaf nodes all leave, to a second field of the rekey index to perform a first node change;
    inserting node numbers of ancestor nodes of leaf nodes, corresponding to the first node change, to a third field of the rekey index to perform a second node change in which nodes connected with only one member are removed and replaced by the ancestor node, and to select a necessary key among encoded keys in a receiver; and
    transmitting, to one or more receivers corresponding to one or more update target nodes, encoded keys for each respective update target node and the rekey index comprising the leave information in the first field, the node numbers of the highest nodes of ancestor nodes in the group whose descendant leaf nodes all leave in the second field, and the node numbers of all nodes connected with only one member in the third field.

6. The method of claim 5, wherein a receiver deletes a node corresponding to the node numbers inserted to the second field of the rekey index, and replaces an ancestor node of a node corresponding to the node numbers inserted to the second field with a sibling node of a node corresponding to the node numbers inserted into the second field.

7. The method of claim 6, wherein the receiver replaces a node corresponding to a unique node number, from among the node numbers inserted into the third field of the rekey index, with a leaf node, and recognizes an ancestor node of the node numbers inserted into the third field as an update target node.

8. The method of claim 7, wherein the transmitted encoded keys are transmitted to the receiver in a predetermined order, and the receiver selects the necessary key for a key update of the update target node from among the transmitted encoded keys using an order of the node number inserted into the third field.

9. The method of claim 8, wherein the receiver selects the necessary key, which is encoded using either a key of a leaf node corresponding to the receiver or a key of an ancestor node of the leaf node corresponding to the device, from among the transmitted encoded keys.

10. A non transitory computer-readable recording medium storing a program for implementing a rekey index generation method, the method comprising:
    inserting join information to a first field of a rekey index when new members join a group;
    splitting one or more existing nodes corresponding to one or more existing members to generate new nodes corresponding to the new members and the one or more existing members;
    inserting node numbers, corresponding to each of the new members, into a second field of the rekey index in an order that enables a receiver to select a necessary key from among transmitted encoded keys based on the order of the new node numbers included in the second field; and
    transmitting, to one or more receivers corresponding to one or more update target nodes, encoded keys for each respective update target node and the rekey index comprising leave information in the first field, the node numbers of the highest nodes of ancestor nodes in the group whose descendant leaf nodes all leave in the second field, and the node numbers of all nodes connected with only one member in the third field.

11. A rekey index generation apparatus, the apparatus comprising:
    a first field generation module for inserting join information to a first field of a rekey index when new members join a group;
    a second field generation module for inserting node numbers, corresponding to each of the new members, to a second field of the rekey index in an order that enables a receiver to select a necessary key from among transmitted encoded keys based on the order of the new node numbers included in the second field;
    a memory for storing the rekey index; and
    a transmitter for transmitting, to one or more receivers corresponding to one or more update target nodes, encoded keys for each respective update target node and the rekey index comprising leave information in the first field, the node numbers of the highest nodes of ancestor nodes in the group whose descendant leaf nodes all leave in the second field, and the node numbers of all nodes connected with only one member in the third field,
    wherein when the new members join the group, one or more existing nodes corresponding to existing members are split to generate new nodes corresponding to the new members and the one or more existing members.

12. The apparatus of claim 11, wherein a receiver identifies an ancestor node of a node corresponding to each of the node numbers, which were inserted into the second field of the rekey index, as an update target node.

13. The apparatus of claim 11, wherein the transmitted encoded keys are transmitted to the receiver in a predetermined order, and the receiver selects the necessary key for a key update of the update target node from the transmitted encoded keys using an order of the node numbers inserted into the second field.

14. The apparatus of claim 13, wherein the receiver selects the necessary key, which is encoded using a key of a leaf node corresponding to the receiver or a key of an ancestor node of the leaf node corresponding to the receiver, from among the transmitted encoded keys.

15. A rekey index generation apparatus, the apparatus comprising:
    a first field generation module inserting leave information to a first field of a rekey index when members leave a group;
    a second field generation module inserting node numbers of highest nodes of all ancestor nodes in the group, whose descendant leaf nodes all leave, into a second field of the rekey index to perform a first node change;
    a third field generation module inserting node numbers of ancestor nodes of leaf nodes, corresponding to the first node change, into a third field of the rekey index to perform a second node change in which nodes connected with only member are removed and replaced by the ancestor node, and to select a necessary key among encoded keys in a receiver;
    a memory for storing the rekey index; and
    a transmitter for transmitting, to one or more receivers corresponding to one or more update target nodes, encoded keys for each respective update target node and the rekey index comprising the leave information in the first field, the node numbers of the highest nodes of ancestor nodes in the group whose descendant leaf nodes all leave in the second field, and the node numbers of all nodes connected with only one member in the third field.

16. The apparatus of claim 15, wherein a receiver deletes a node corresponding to the node numbers inserted into the second field of the rekey index, and replaces an ancestor node of a node corresponding to the node numbers inserted into the second field with a sibling node of a node corresponding to the node numbers inserted into the second field.

17. The apparatus of claim 16, wherein the receiver replaces a node corresponding to a unique node number from among the node numbers inserted into the third field of the rekey index with a leaf node, and recognizes an ancestor node of the node numbers inserted into the third field as an update target node.

18. The apparatus of claim 15, wherein the transmitted encoded keys are transmitted to the receiver in a predetermined order, and the receiver selects the necessary key for a key update of the update target node from among the transmitted encoded keys using an order of the node number inserted into the third field.

19. The apparatus of claim 18, wherein the receiver selects the necessary key, which is encoded using either a key of a leaf node corresponding to the receiver or a key of an ancestor node of the leaf node corresponding to the device, from among the transmitted encoded keys.

* * * * *